US011772526B2

(12) United States Patent
Suzuki et al.

(10) Patent No.: US 11,772,526 B2
(45) Date of Patent: Oct. 3, 2023

(54) VEHICLE SEAT WITH CENTER SERVICE DOOR

(71) Applicant: Honda Motor Co., Ltd., Tokyo (JP)

(72) Inventors: Junichi Suzuki, Royal Oak, MI (US); Fernando M. Rosero, Rochester Hills, MI (US); Eric D. Daume, Plain City, OH (US); Yosuke Nishimura, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 109 days.

(21) Appl. No.: 17/493,141

(22) Filed: Oct. 4, 2021

(65) Prior Publication Data

US 2023/0107157 A1    Apr. 6, 2023

(51) Int. Cl.
*B60N 2/20* (2006.01)
*B60N 2/75* (2018.01)
*B60N 2/30* (2006.01)

(52) U.S. Cl.
CPC ........... *B60N 2/206* (2013.01); *B60N 2/79* (2018.02); *B60N 2/3081* (2013.01); *B60N 2/3084* (2013.01); *B60N 2/3086* (2013.01); *B60N 2/753* (2018.02); *B60N 2/757* (2018.02)

(58) Field of Classification Search
CPC .. B60N 2/3081; B60N 2/3084; B60N 2/3086; B60N 2/753; B60N 2/757; B60N 2/76; B60N 2/79; B60N 2/206
See application file for complete search history.

(56) References Cited

U.S. PATENT DOCUMENTS

| | | | |
|---|---|---|---|
| 8,056,954 B2 * | 11/2011 | Homier | B60N 2/3013 296/65.01 |
| 8,336,942 B2 * | 12/2012 | Yamashita | B60R 7/043 296/65.03 |
| 8,714,619 B2 * | 5/2014 | Lindley | B60N 2/3043 296/65.09 |
| 9,333,884 B2 * | 5/2016 | Tachikawa | B60N 2/206 |
| 9,616,786 B2 * | 4/2017 | Tanaka | B60N 2/5816 |
| 11,352,143 B2 * | 6/2022 | Schultz | B64D 11/064 |

(Continued)

FOREIGN PATENT DOCUMENTS

| | | |
|---|---|---|
| DE | 102008025198 | 12/2009 |
| EP | 1731351 | 12/2006 |

(Continued)

*Primary Examiner* — Syed A Islam
(74) *Attorney, Agent, or Firm* — Mark E. Duell; RANKIN, HILL & CLARK LLP

(57) ABSTRACT

A vehicle seat includes a seat base and a seat back which together define a first outboard seating section, a second outboard seating section, and a center seating section. A center seat back of the center seating section is defined by a service door and a removable panel provided beneath the service door in a height direction of the vehicle seat. The service door is connected to one of the seat base and the seat back at a first hinged connection. The center seat back is configured to have a fold down, service position where the service door pivoted at the first hinged connection is located above the seat base to provide access to an area rearward the seat back in a front-rear direction of the vehicle seat. The service door is prevented from moving to the fold down, service position with the panel located beneath the service door.

20 Claims, 5 Drawing Sheets

(56) References Cited

U.S. PATENT DOCUMENTS

| | | | |
|---|---|---|---|
| 2004/0070243 A1* | 4/2004 | Cha | B60N 2/3009 297/232 |
| 2007/0069561 A1* | 3/2007 | Schnabel | B60N 2/757 297/130 |
| 2007/0216185 A1* | 9/2007 | McMillen | B60N 2/859 296/64 |

FOREIGN PATENT DOCUMENTS

| | | |
|---|---|---|
| JP | 4442389 | 3/2010 |
| JP | 2011213154 | 10/2011 |
| JP | 2019085082 | 6/2019 |

* cited by examiner

VEHICLE SEAT WITH CENTER SERVICE DOOR

BACKGROUND

There are various configurations of vehicle seats, and one configuration includes a center seat part that can be deployed as an armrest. Vehicle seats having this configuration are typically installed as center seats and rear seats in vehicles. The armrest is movable between seat backs of left and right outboard seats from an upright position to an inclined position. Typically, a backrest surface forming a seat back is located on a front side of the armrest in the upright position. The known vehicle seat having the above configuration generally includes a stationary backing arranged behind the armrest and located in a space between the left and right outboard seats. The stationary backing includes a base frame that is typically connected to an armrest frame via a hinge portion. A panel can be fixedly provided on the stational backing to cover the hinge portion and prevent the hinge portion from being exposed to the outside when the armrest is in the inclined position. With this known arrangement of the vehicle seat access behind the vehicle seat for service and/or maintenance via the center seat part is prevented.

BRIEF DESCRIPTION

According to one aspect, a vehicle seat comprises a seat base and a seat back. The seat base and seat back together define a first outboard seating section, a second outboard seating section spaced from the first outboard seating section in a width direction of the vehicle seat, and a center seating section positioned between the first and second outboard seating sections in the width direction. A center seat back of the center seating section is defined by a service door and a removable panel provided beneath the service door in a height direction of the vehicle seat. The service door is connected to one of the seat base and the seat back at a first hinged connection. The center seat back is configured to have a fold down, service position where the service door pivoted at the first hinged connection is located above the seat base to provide access to an area rearward the seat back in a front-rear direction of the vehicle seat. The service door is prevented from moving to the fold down, service position with the panel located beneath the service door.

According to another aspect, a vehicle seat comprises a seat base and a seat back. The seat base and seat back together define a first outboard seating section, a second outboard seating section spaced from the first outboard seating section in a width direction of the vehicle seat, and a center seating section positioned between the first and second outboard seating sections in the width direction. The center seating section is defined by service door and a removable panel provided beneath the service door in a height direction of the vehicle seat. The service door includes a backing and an armrest forward of the backing in a front-rear direction of the vehicle seat. The center seating section is configured to have an upright, stowed position where the panel and the armrest define a center seat back for the center seating section of the vehicle seat. The center seating section is configured to have an inclined, in use position where the armrest is pivoted forward such that a front surface portion of the armrest is located above the seat base in the height direction and the panel is provided between the seat base and the front surface portion. With the panel removed from beneath the service door the center seating section is configured to move to a fold down, service position where both the backing and the armrest of the service door are located above the seat base to provide access to an area rearward the seat back in the front-rear direction. The center seating section is prevented from moving to the fold down, service position with the panel located beneath the service door.

According to another aspect, a method for using a center seating section that is located between first and second outboard seating sections in a width direction of a vehicle seat as a service door to provide access rearward of the vehicle seat in a front-rear direction of the vehicle seat is provided. The center seating section includes a service door provided as a center seat back for the center seating section, and a panel removable from the vehicle seat. The panel is located beneath the service door in a height direction of the vehicle seat. The method comprises removing the panel from beneath the service door, and moving the service door from an upright, stowed position to a fold down, service position, wherein the service door is prevented from moving to the fold down, service position with the panel located beneath the service door.

DETAILED DESCRIPTION

Figure 1:
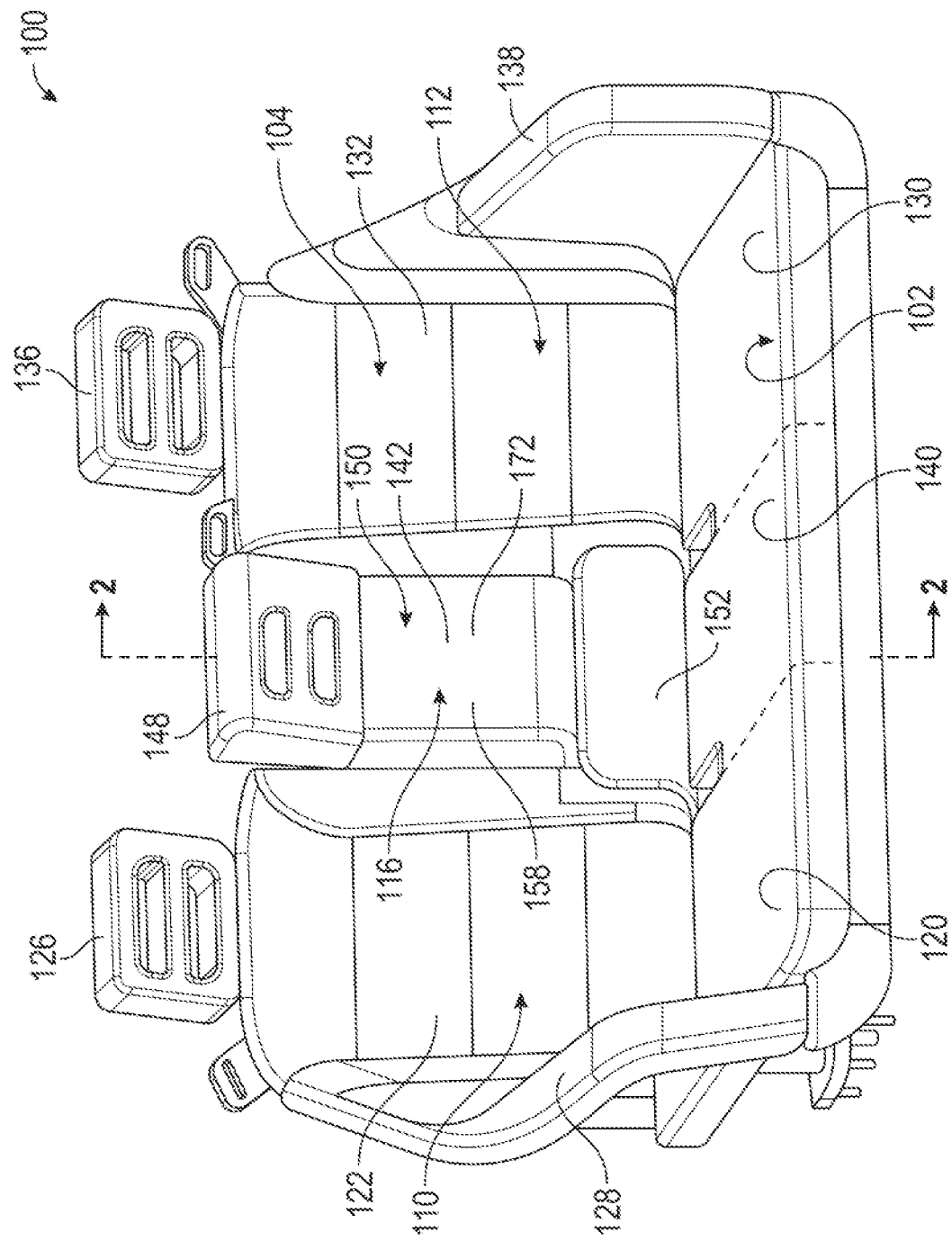
FIG. 1 is a perspective view of a vehicle seat according to the present disclosure, the vehicle seat including a center seating section defined by a service door and a removable panel, the service door in an upright, stowed position relative to left and right outboard seating sections.

It should, of course, be understood that the description and drawings herein are merely illustrative and that various modifications and changes can be made in the structures disclosed without departing from the present disclosure. In this example embodiment, a front-rear direction, a width direction, and a height direction of the exemplary vehicle seat match a front-rear (longitudinal) direction, a left-right (width) direction, and a vertical (height) direction of a vehicle within which the exemplary vehicle seat is to be mounted. Moreover, any term of degree used herein, such as "substantially," means a reasonable amount of deviation of the modified word is contemplated such that the end result is not significantly changed.

Referring now to the drawings, wherein like numerals refer to like parts throughout the several views, FIGS. 1-5 illustrate an exemplary vehicle seat 100 according to the present disclosure. The vehicle seat 100 comprises a seat base 102 and a seat back 104. The seat base 102 and the seat back 104 together define a first outboard seating section 110, a second outboard seating section 112 spaced from the first outboard seating section in a width direction of the vehicle seat, and a center seating section 116 positioned between the first and second outboard seating sections 110, 112 in the width direction. The first outboard seating section 110 includes a first seat base 120 and a first seat back 122, and optionally a first headrest 126 and a first armrest 128. The second outboard seating section 112 includes a second seat base 130 and a second seat back 132, and optionally a second headrest 136 and a second armrest 138. The center seating section 116 includes a center seat base 140 and a center seat back 142, and optionally a center headrest 148. It should be appreciated that the center seating section 116 serves as an auxiliary seat between the first and second outboard seating sections 110, 112. Therefore, horizontal widths of the center seat base 140 and the center seat back 142 can be set to be about half of those of the first and second seat bases 120, 130 and first and second seat backs 122, 132 of the respective first and second outboard seating sections 110, 112.

Figure 2:
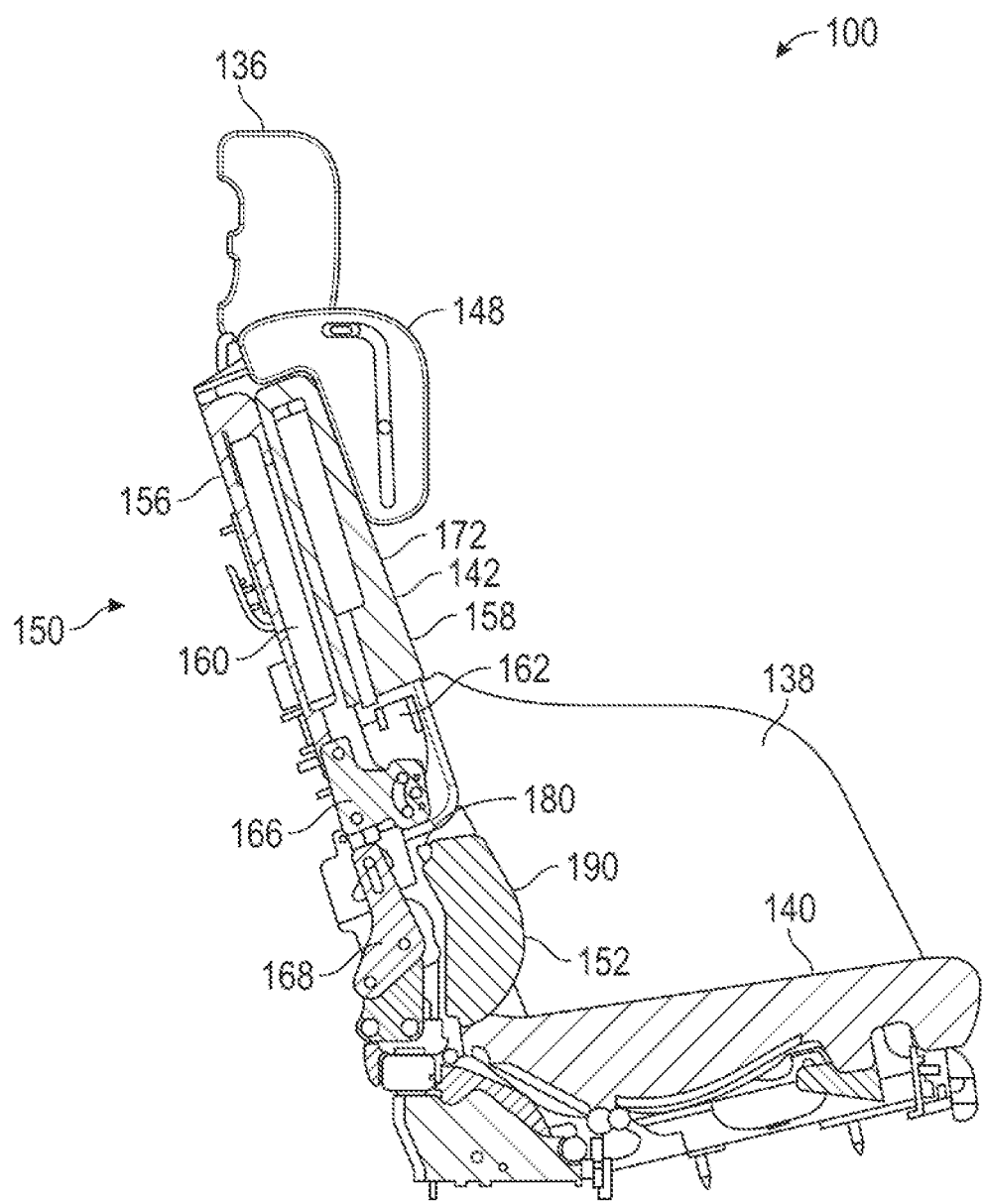
FIG. 2 is a cross-sectional view of the vehicle seat taken generally along line 2-2 of FIG. 1.
Figure 3:
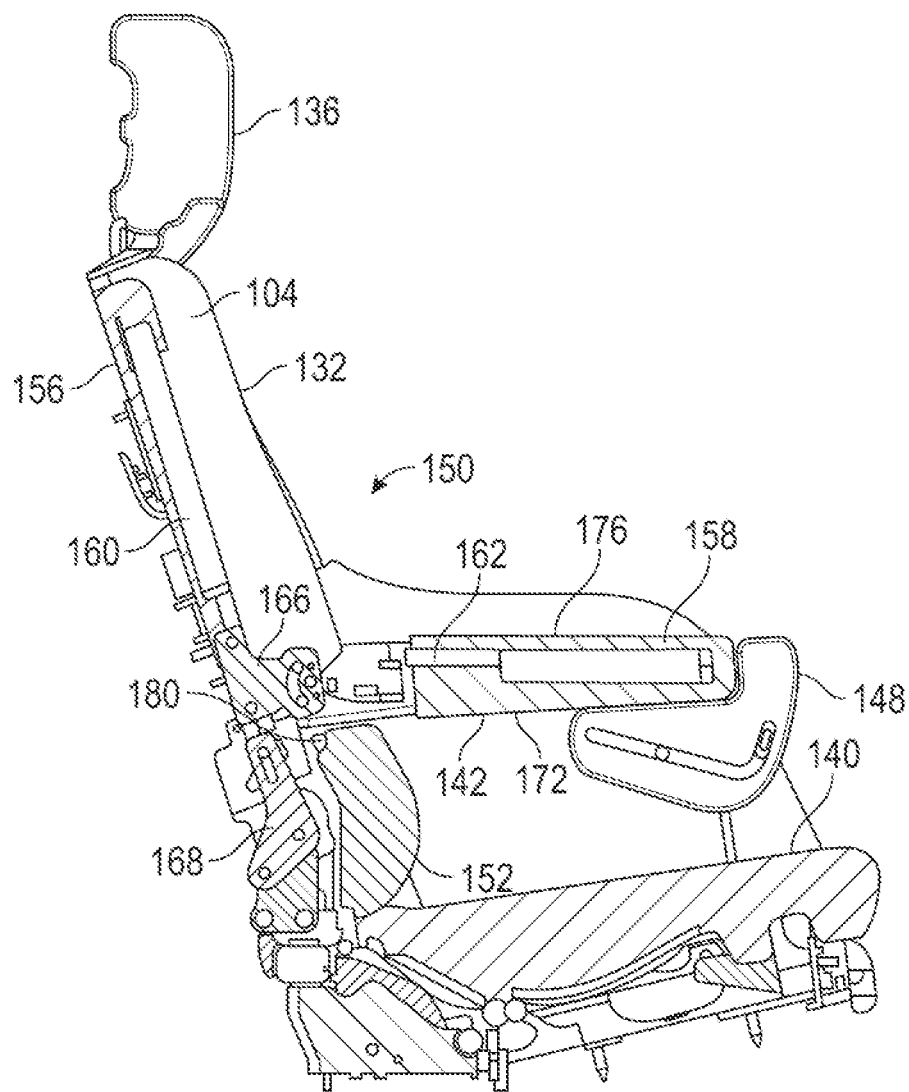
FIG. 3 is a cross-sectional view similar to FIG. 2 but with an armrest of the service door in an inclined, in use position relative to the left and right outboard seating sections.
Figure 4:
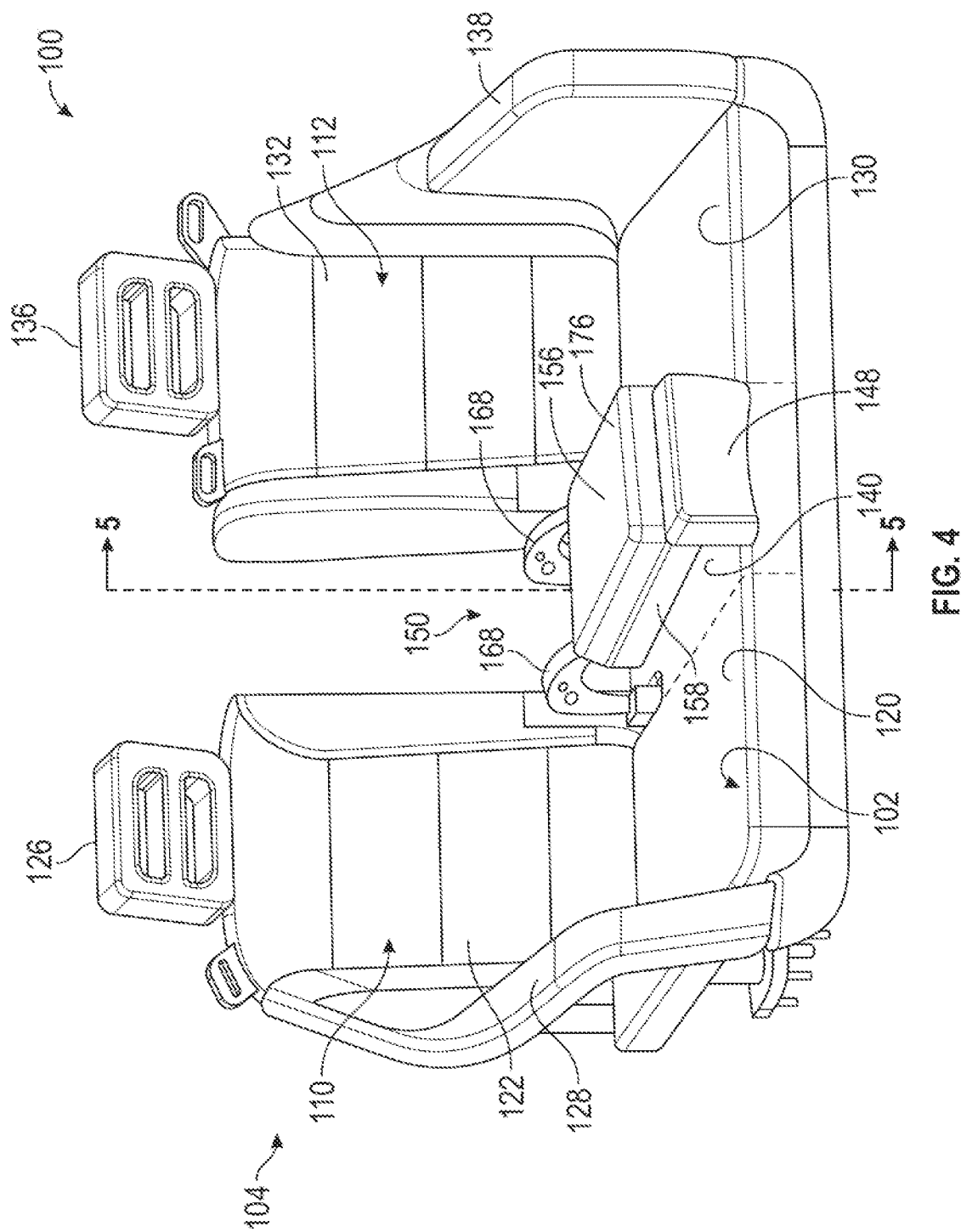
FIG. 4 is a perspective view of the vehicle seat with the service door in a fold down, service position relative to the left and right outboard seating sections and the panel removed from the vehicle seat.
Figure 5:
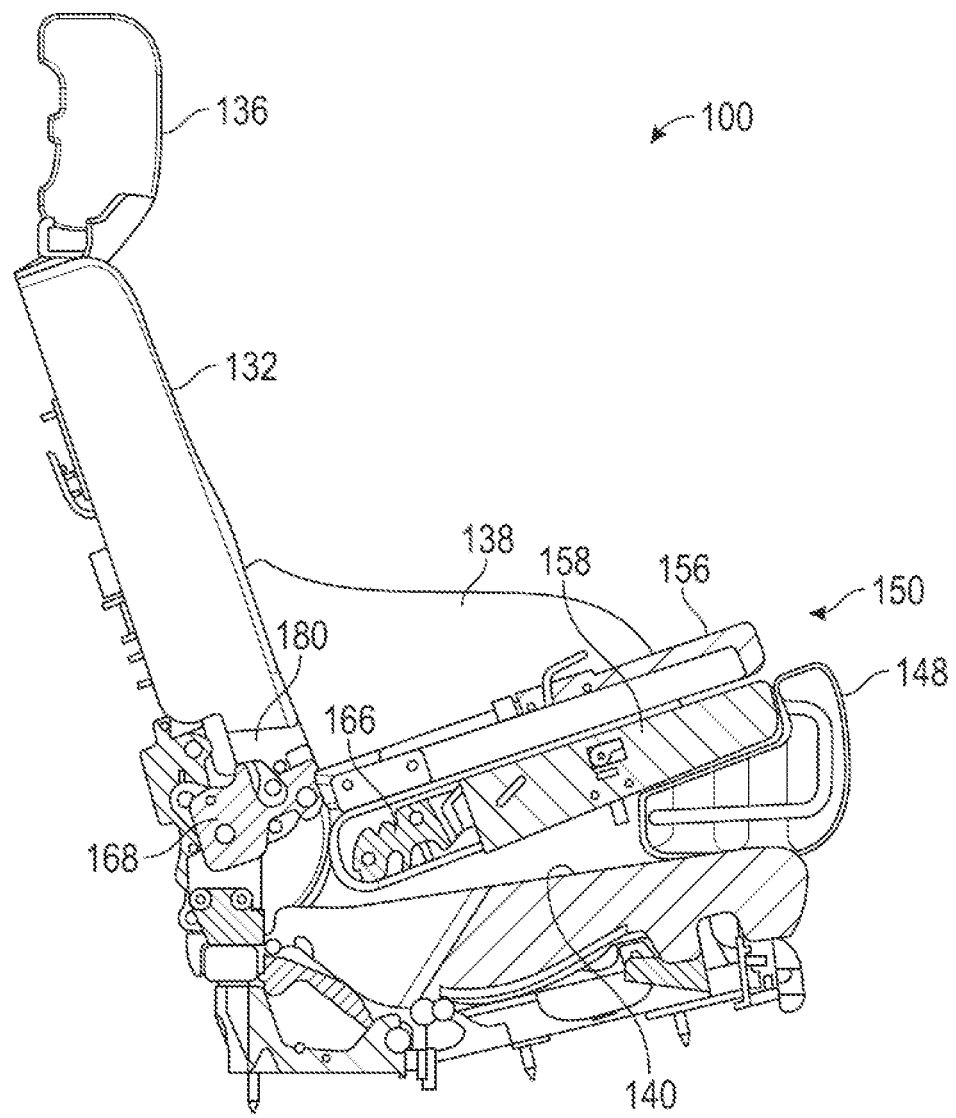
FIG. 5 is a cross-sectional view of the vehicle seat taken generally along line 5-5 of FIG. 4.

According to the present disclosure, the center seat back 142 of the center seating section 116 is defined by a service door 150 and a removable panel 152 provided beneath the service door 150 in a height direction of the vehicle seat 100. In the aspect of FIGS. 2 and 3, the service door 150 can be defined by an armrest assembly which includes a backing 156 and an armrest 158 forward of the backing in a front-rear direction of the vehicle seat, and will be described hereinafter as an armrest assembly. However, it should be appreciated that the armrest 158 is not required and that the service door 150 can include the backing 156 and a stationary cushion secured to the backing. The center headrest 148 is connected to one of the backing 156 and the armrest 158, and as depicted, the center headrest 148 is connected to the armrest 158. The backing 156 includes a base frame 160 that is connected to an armrest frame 162 at a first hinged connection 166 where the armrest is movable relative to the backing, and is connected to framing of one of the seat base 102 and the seat back 104 at a second hinged connection 168. The second hinged connection 168 is positioned beneath the first hinged connection in the height direction, which allows for unobstructed movement of the service door 150 relative to the first and second seat backs 122, 132.

The center seat back 142 of the center seating section 116 is configured to have an upright, stowed position relative to the first and second seat backs 122, 132 of the respective first and second outboard seating sections 110, 112 (FIGS. 1 and 2). In this position, the removable panel 152 is provided beneath service door 150, and a front surface portion 172 of the armrest 158, if provided, defines a front surface portion of the center seat back 142. A lock mechanism (not visible) can be provided for maintaining the upright, stowed position of the service door 150. In the embodiment where the service door 150 is defined as the armrest assembly, the center seat back 142 of the center seating section 116 is configured to have an inclined, in use position relative to the first and second outboard seating sections 110, 112 (FIG. 3) where the armrest 158 is moved (i.e., tilted down) at the first hinged connection 166 such that the front surface portion 172 of the armrest 158 is located above (i.e., overlying) the center seat base 140 in the height direction. In the inclined, in use position, a rear surface portion 176 of the armrest 158 is provided as an elbow rest for an occupant seated in one of the first and second outboard seating sections 110, 112, and an additional occupant cannot be seated in the center seating section 116 of the vehicle seat 100. Further, in the inclined, in use position, the panel 152 is provided and maintained or sandwiched between the center seat base 140 and the front surface portion 172 of the armrest, and the center headrest 148, if connected to the armrest, is spaced above the seat base 102 in the height direction. According to the present disclosure, with the panel 152 removed from the vehicle seat 100 the center seat back 142 of the center seating section 116 is further configured to move (i.e., tilt down) at the second hinged connection 168 to a fold down, service position relative to the first and second outboard seating sections 110, 112 (FIGS. 4 and 5) to provide access to an area rearward the seat back 102 in the front-rear direction for ease of maintenance and service of the vehicle seat. In this position, both the backing 156 and the armrest 158, if provided, of the service door 150 are located above (i.e., overlying) the seat base 102. In the fold down, service position of the service door 150 the center headrest 148 can directly contact the seat base 102 to provide support to the service door. It should be appreciated that the service door 150 is prevented from moving toward the fold down, service position with the panel 152 in place on the center seating section 116, as depicted in FIG. 1. Therefore, inadvertent movement of the service door to the fold down, service position is prevented by use of the panel 152.

With continued reference to FIGS. 1-3, the second hinged connection 168 is arranged behind the removable panel 152, and the panel 152 is shaped and sized to conceal the second hinged connection 168 in a front view of the vehicle seat 100. Therefore, in both the upright, stowed position and the inclined, in use position where the panel 152 is in position beneath the service door 150, the aesthetic appearance of the vehicle seat 100 between the first and second outboard seating sections 110, 112 is maintained. To that end, the panel 152 is sized to span an entire width dimension of the service door 150, particularly the armrest 158, in the front view of the vehicle seat 100, and, more particularly, is sized to at least partially overlap each of the first and second seat backs 122, 132 of the respective first and second outboard seating sections 110, 112 in the width direction. To secure the panel 152, according to one embodiment a pocket or recessed portion 180 is defined by a lower end portion of the seat back 104 in the height direction (see FIGS. 2 and 3), and the pocket or recessed portion 180 is adapted to receive an upper section of the panel 152 in the height direction. In the depicted aspect, the pocket or recessed portion 180 is defined in each of the first and second seat backs 122, 132, and is sized such that when fitted within the pocket or recessed portion 180 the upper section of the panel 152 is positioned beneath the armrest 158 in the height direction. In FIGS. 2 and 3, a lower section of the panel 152 is fitted between the seat base 102 and the seat back 104. With this arrangement, the panel 152 can be easily removed from the vehicle seat 100 to allow the service door 150 (i.e., the backing 156 and the armrest 158 in the illustrated embodiment) to move to the fold down, service position. However, it should be appreciated that the panel 152 can be mechanically connected to the vehicle seat 100 (e.g., by fasteners, straps, and the like) to further secure the panel in both the upright, stowed position and the inclined, in use position of the center seating section 116.

Further, as best depicted in FIG. 2, in a side view of the vehicle seat 100 the panel 152 is substantially crescent shaped with a front surface 190 of the panel 152 and the front surface portion 172 of the armrest 158 together defining the center seat back 140 for the center seating section 116. And in the side view a contour of the front surface 190 of the panel 152 substantially matches a contour of a lower section of each of the first and second seat backs 122, 132 of the first and second outboard seating sections 110, 112 in the height and width directions so as to substantially maintain a styling of the seat back 104 in the height and width directions. Accordingly, the present disclosure with the removable panel 152 promotes the aesthetics to the center seating section 116 of the vehicle seat 100. The arrangement of the removable panel 152 keeps the styling shape of the vehicle seat 100 while allowing access the second hinged connection 168 behind by panel and allowing movement of the service door 150 to the fold down, service position during service and/or maintenance of the vehicle seat 100.

The present disclosure further provides a method for using the center seating section 116 that is located between the first and second outboard seating sections 110, 112 in the width direction as a service door to provide access rearward of the vehicle seat 100 in the front-rear direction. As described above, the center seating section 116 includes the service door 150 provided as the center seat back 140 and the removable panel 152 located beneath the service door in the height direction. The exemplary method comprises removing the panel 152 from beneath the service door 150, and then moving the service door 150 from an upright, stowed position to a fold down, service position, wherein the service door is prevented from moving to the fold down, service position with the panel 152 located beneath the service door 150.

In one embodiment, the service door 150 includes the backing 156 and the armrest 158 forward of the backing in the front-rear direction, the first hinged connection 166 between the backing 156 and the armrest 158, the second hinged connection 168 between the backing 156 and the vehicle seat 100 and located beneath the first hinged connection 166 in the height direction, and the panel 152 sized to cover the second hinged connection 168. The exemplary method further includes with the panel 152 connect to the vehicle seat 100, moving the armrest 158 at the first hinged connection between the upright, stowed position and the inclined, in use position, and with the panel 152 removed from the vehicle seat 100, moving the service door 150 at the second hinged connection 168 between the upright, stowed position and the fold down, service position. The method further includes providing the pocket of recessed portion 180 in the seat back 104 adapted to receive the upper section of the panel 152 in the height direction, and fitting the lower section of the panel 152 between the seat base 102 and the seat back 104.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat comprising:
a seat base and a seat back, the seat base and seat back together defining a first outboard seating section, a second outboard seating section spaced from the first outboard seating section in a width direction of the vehicle seat, and a center seating section positioned between the first and second outboard seating sections in the width direction,
wherein a center seat back of the center seating section is defined by a service door and a removable panel provided beneath the service door in a height direction of the vehicle seat, the service door connected to one of the seat base and the seat back at a first hinged connection,
wherein the center seat back is configured to have a fold down, service position where the service door pivoted at the first hinged connection is located above the seat base to provide access to an area rearward the seat back in a front-rear direction of the vehicle seat, and the service door is prevented from moving to the fold down, service position with the panel located beneath the service door.

2. The vehicle seat of claim 1, wherein the panel is shaped and sized to conceal the first hinged connection in a front view of the vehicle seat.

3. The vehicle seat of claim 1, wherein the service door includes a backing and an armrest forward of the backing in the front-rear direction, the armrest connected to the backing at a second hinged connection, and the backing connected to one of the seat base and the seat back at the first hinged connection.

4. The vehicle seat of claim 3, wherein the center seat back is configured to have an inclined, in use position where the armrest pivoted at the second hinged connection is located above the seat base in the height direction.

5. The vehicle seat of claim 4, wherein the second hinged connection is located above the first hinged connection in the height direction.

6. The vehicle seat of claim 4, wherein a headrest is connected to the armrest, where in the inclined, in use position the headrest is spaced above the seat base in the height direction with the panel sandwiched between the seat base and the armrest, and in the fold down, service position of the center seat back the headrest directly contacts the seat base to support the service door.

7. The vehicle seat of claim 1, wherein the seat back includes a recessed portion adapted to receive an upper section of the panel in the height direction, and a lower section of the panel is fitted between the seat base and the seat back.

8. The vehicle seat of claim 1, wherein the panel is sized to span an entire width dimension of the service door in a front view of the vehicle seat.

9. A vehicle seat comprising:
a seat base and a seat back, the seat base and seat back together defining a first outboard seating section, a second outboard seating section spaced from the first outboard seating section in a width direction of the vehicle seat, and a center seating section positioned between the first and second outboard seating sections in the width direction,
wherein the center seating section is defined by service door and a removable panel provided beneath the service door in a height direction of the vehicle seat,
wherein the service door includes a backing and an armrest forward of the backing in a front-rear direction of the vehicle seat,
wherein the center seating section is configured to have an upright, stowed position where the panel and the armrest define a center seat back for the center seating section of the vehicle seat, and the center seating section is configured to have an inclined, in use position where the armrest is pivoted forward such that a front surface portion of the armrest is located above the seat base in the height direction and the panel is provided between the seat base and the front surface portion, and
wherein with the panel removed from beneath the service door the center seating section is configured to move to a fold down, service position where both the backing and the armrest of the service door are located above the seat base to provide access to an area rearward the seat back in the front-rear direction, and the center seating section is prevented from moving to the fold down, service position with the panel located beneath the service door.

10. The vehicle seat of claim 9, wherein the center seating section includes a first hinged connection where the armrest is movable relative to the backing and a second hinged connection where the center seating section is movable to the fold down position, wherein the first hinged connection is above the second hinged connection in the height direction.

11. The vehicle seat of claim 10, wherein the panel is shaped and sized to conceal the second hinged connection in a front view of the vehicle seat.

12. The vehicle seat of claim 11, wherein a pocket is defined by a lower end portion of the seat back in the height direction, and the panel is at least partially received in the pocket.

13. The vehicle seat of claim 9, wherein the panel is sized to span an entire width dimension of the armrest in a front view of the vehicle seat and to at least partially overlap each of the first and second outboard seating sections in the width direction.

14. The vehicle seat of claim 13, wherein each of the first and second outboard seating sections includes a recessed portion adapted to receive an upper section of the panel in the height direction.

15. The vehicle seat of claim 14, wherein a lower section of the panel is fitted between the seat base and the seat back.

16. The vehicle seat of claim 9, where in a side view of the vehicle seat a front surface of the panel and the front surface portion of the armrest together define the center seat back for the center seating section.

17. The vehicle seat of claim 16, where in the side view a contour of the front surface of the panel substantially matches a contour of a lower section of the seat back in the height direction so as to substantially maintain a styling of the seat back in the width direction.

18. A method for using a center seating section that is located between first and second outboard seating sections in a width direction of a vehicle seat as a service door to provide access rearward of the vehicle seat in a front-rear direction of the vehicle seat, where the center seating section includes:
a service door provided as a center seat back for the center seating section, and
a panel removable from the vehicle seat, the panel located beneath the service door in a height direction of the vehicle seat,
the method comprising:
removing the panel from beneath the service door, and moving the service door from an upright, stowed position to a fold down, service position, wherein the service door is prevented from moving to the fold down, service position with the panel located beneath the service door.

19. The method of claim 18, wherein the service door includes:
a backing and an armrest forward of the backing in the front-rear direction,
a first hinged connection between the backing and the armrest,
a second hinged connection between the backing and the vehicle seat and located beneath the first hinged connection in the height direction, and
the panel sized to cover the second hinged connection,
the method including with the panel connect to the vehicle seat, moving the armrest at the first hinged connection between the upright, stowed position and an inclined, in use position of the armrest, and with the panel removed from the vehicle seat, moving the service door at the second hinged connection between the upright, stowed position and the fold down, service position.

20. The method of claim 18, wherein the vehicle seat includes a seat base and a seat back, the seat base and seat back together defining the first and second outboard seating sections, the method including providing a recessed portion in the seat back adapted to receive an upper section of the panel in the height direction, and fitting a lower section of the panel between the seat base and the seat back.

* * * * *